(12) United States Patent
Kikuchi et al.

(10) Patent No.: US 6,335,301 B1
(45) Date of Patent: Jan. 1, 2002

(54) DIELECTRIC CERAMIC COMPOSITION, ELECTRIC DEVICE AND PRODUCTION METHOD THEREOF

(75) Inventors: Tatuya Kikuchi; Hitoshi Tanaka, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/526,888

(22) Filed: Mar. 16, 2000

(30) Foreign Application Priority Data

Mar. 30, 1999 (JP) .......................................... 11-088313

(51) Int. Cl.[7] .............................. C04B 35/46; H01G 4/06
(52) U.S. Cl. ................. 501/136; 361/321.1; 361/321.2; 361/321.4; 428/697
(58) Field of Search ....................... 501/136; 361/321.1, 361/321.2, 321.4; 428/697

(56) References Cited

U.S. PATENT DOCUMENTS 4,293,534 A * 10/1981 Arendt ........................ 501/136
4,859,641 A * 8/1989 Fujino et al. ................ 501/136
5,204,301 A * 4/1993 Ohkubo et al. .............. 501/136
6,146,907 A * 11/2000 Xiang et al. ................. 501/136

FOREIGN PATENT DOCUMENTS

| JP | 60-131708 | 7/1985 |
| JP | 7-66693 | 7/1995 |

* cited by examiner

*Primary Examiner*—Philip Tucker
(74) *Attorney, Agent, or Firm*—Oliff & Berridge, PLC

(57) ABSTRACT

A dielectric ceramic composition, comprised of a main component expressed by a composition formula $[SrZrO_3]_x + [CaTiO_3]_{(1-x)}$ wherein the "x" satisfies $1.00 \geq x \geq 0.60$, and sub components such as $B_2O_3$, $SiO_2$, ZnO, $Al_2O_3$ and $Li_2O$. Where the amounts of $B_2O_3$, $SiO_2$, ZnO, $Al_2O_3$ and $Li_2O$ respectively equal "a", "b", "c", "d", and "e" parts by weight with respect to 100 parts by weight of the main component, $1.80 > a \geq 0.25$, $1.80 > b \geq 0.20$, $1.80 > c \geq 0$, $1.10 > d \geq 0$, $6.30 > e \geq 0.05$ and $10.00 > a+b+c+d+e \geq 0.50$ are satisfied. The dielectric ceramic composition can be burned at 1000° C. or less and is able to be used in a multi-layer chip capacitor suitable for high frequencies capable of using Cu or Ag as an internal conductor.

8 Claims, 1 Drawing Sheet

DIELECTRIC CERAMIC COMPOSITION, ELECTRIC DEVICE AND PRODUCTION METHOD THEREOF

BACKGROUND OF THE INVENTION

1. Field of the Invention

The present invention relates to a dielectric ceramic composition used in an electric device, such as a multi-layer chip capacitor, an electric device using the dielectric ceramic composition and a method of producing the electric device, particularly relates to a dielectric ceramic composition used in a multi-layer chip capacitor suitable for high frequencies.

2. Description of the Related Art

Heretofore, a variety of dielectric ceramic materials have been widely used as a material for a multi-layer chip capacitors. Since electric devices used in mobile communications, such as a cellular phones, are driven in high frequency ranges, development of dielectric materials suitable for high frequency ranges has been increasing.

As characteristics of a dielectric ceramic material used in high frequency ranges, it is desired to have an appropriate dielectric constant $\epsilon r$, a large dielectric loss Q, a resonance frequency temperature coefficient TCf being close negatively and positively to 0 (NPO). For example, $BaTi_4O_9$+ReO based compositions and $MgTiO_3$—$CaTiO_3$ based compositions, etc. have been developed as compositions fulfilling the above requirements.

However, the burning temperature of these compositions is extremely high at 1300 to 1400° C., so that Pd or Pd—Ag alloy, etc. which have a high melting point have to be used as an internal conductive metal inside a multi-layer chip capacitor.

Other than the above, development has been also made of $CaZrO_3$—$SrZrO_3$ based materials with the assumption of being used as an internal conductor of Ni as disclosed in Japanese Examined patent Publication (Kokoku) No. 7-66693, however, the materials are burned at 1300 to 1400° C.

Also, development of CaSr—ZrTi—Mn based materials is disclosed in the Japanese Unexamined Patent Publication (Kokai) No. 60-131708. In this publication, a dielectric ceramic composition for a capacitor using Ni as a terminal electrode is disclosed. The burning temperature of the Ni terminal is 800 to 1000° C., while the ceramic composition is burned at 1350° C.

Since the above Pd, Ni, etc. have a high conductive resistance, when used as an internal electrode of a multi-layer chip capacitor, the ratio of an electrode loss becomes larger than that of a dielectric loss in a high frequency range. As a result, the Q value of the capacitor becomes smaller, it is not possible to make the most of the excellent high frequency characteristics that the dielectric materials originally have, and it has been difficult to use it in high frequency circuits.

Thus, such metals having a low conductive resistance as Cu and Ag have been proposed. When using Cu or Ag as an internal electrode, however, the burning temperature of the dielectric material must not be more than 1000° C. It is because when exceeding 1000° C., the metals are exposed to the temperature ranges higher than or closer to their melting points, so that defaults are caused due to particles melting or becoming ball-shaped, and thus the metals cease to function as electrodes.

In the case of dielectric ceramic composition disclosed in the above Japanese Examined patent Publication (Kokoku) No. 7-66693, it was difficult to attain a burning temperature of 1000° C. or less while maintaining the desired electric characteristics.

SUMMARY OF THE INVENTION

An object of the present invention is to overcome the above disadvantages by providing a dielectric ceramic composition able to be burned at a relatively low temperature of 1000° C. or less both in air and in a non-oxidizing atmosphere, having a high Qf value and a small temperature coefficient TCf.

To attain the above object, an electric ceramic composition of the present invention, comprises a main component expressed by a composition formula $[SrZrO_3]_x+[CaTiO_3]_{(1-x)}$ wherein "x" indicating a mole ratio in the composition formula satisfies $1.00 \geq x \geq 0.60$ and a sub component including at least $B_2O_3$, $SiO_2$ and $Li_2O$ and satisfies $1.80 > a \geq 0.25$
$1.80 > b \geq 0.20$
$1.80 > c \geq 0$
$1.10 > d \geq 0$
$6.30 > e \geq 0.05$
$10.00 > a+b+c+d+e \geq 0.50$ Where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component.

The dielectric ceramic composition of the present invention is able to be burned at a relatively low temperature of 1000° C. or less, has a high Qf value (for example Qf=2000 or more), a desired dielectric constant (for example $\epsilon r$=24 to 80) and a temperature coefficient TCf which is +300 to −80 ppm/° C. Accordingly, the dielectric ceramic composition can be preferably applied to a multi-layer chip capacitor having Cu, Ag, etc. as an internal conductor, and particularly applied to an electric devices used in high frequency regions.

Further, in the case of a dielectric ceramic composition wherein the value of the above "x" satisfies $1.00 \geq x \geq 0.90$, the Qf value further increases (for example Qf=4000 or more) and the temperature coefficient TCf becomes +100 to −80 ppm/° C., so that the characteristics of the dielectric ceramic composition become still better.

An electric device according to the present invention comprises an internal electrode layer and a dielectric layer, wherein said dielectric layer comprises:
   a main component expressed by $[SrZrO_3]_x+[CaTiO_3]_{(1-x)}$, wherein "x" indicating a mole ratio in the composition formula satisfies $1.00 \geq x \geq 0.60$; and
   a sub component including at least $B_2O_3$, $SiO_2$ and $Li_2O$,
and satisfies:
   $1.80 > a \geq 0.25$
   $1.80 > b \geq 0.20$
   $1.80 > c \geq 0$
   $1.10 > d \geq 0$
   $6.30 > e \geq 0.05$
   $10.00 > a+b+c+d+e \geq 0.50$ Where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component.

Preferably, said internal electrode layer contains Cu and/or Ag.

A method of producing an electric device according to the present invention, comprises the steps of:

preparing a material of a main component expressed by a composition formula $[SrZrO_3]_x+[CaTiO_3]_{(1-x)}$ wherein "x" indicating a mole ratio satisfies $1.00 \geq x \geq 0.60$, preparing a material of a sub component including at least $B_2O_3$, $SiO_2$ and $Li_2O$, and satisfying $1.80 > a \geq 0.25$
$1.80 > b \geq 0.20$
$1.80 > c \geq 0$
$1.10 > d \geq 0$
$6.30 > e > 0.05$
$10.00 > a+b+c+d+e \geq 0.50$ where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component;

obtaining a dielectric layer paste by mixing the material of the main component with the material of the sub component;

obtaining an internal electrode layer paste;

preparing a green chip to be an element body after being burned having a dielectric layer and an internal electrode layer by using said dielectric layer paste and internal electrode layer paste; and burning said green chip at a temperature of 900 to 1000° C.

Preferably, Cu and/or Ag is contained as an electroconductive material when preparing the internal electrode layer paste.

Note that in this specification, respective oxides composing the main component and the sub component are expressed by a stoichiometry composition, but oxidizing conditions of the respective oxides may be outside of the stoichiometry composition. Note that the above ratios of the respective sub components are obtained by measuring respective metal amounts included in the oxides composing the respective sub components and converting them to the amount of the respective oxides of the above stoichiometry composition.

BRIEF DESCRIPTION OF THE DRAWINGS

The present invention will be explained below based on the embodiments given with reference to the attached drawing, in which.

DESCRIPTION OF THE PREFERRED EMBODIMENTS

Multi-Layer Ceramic Capacitor

Figure 1:
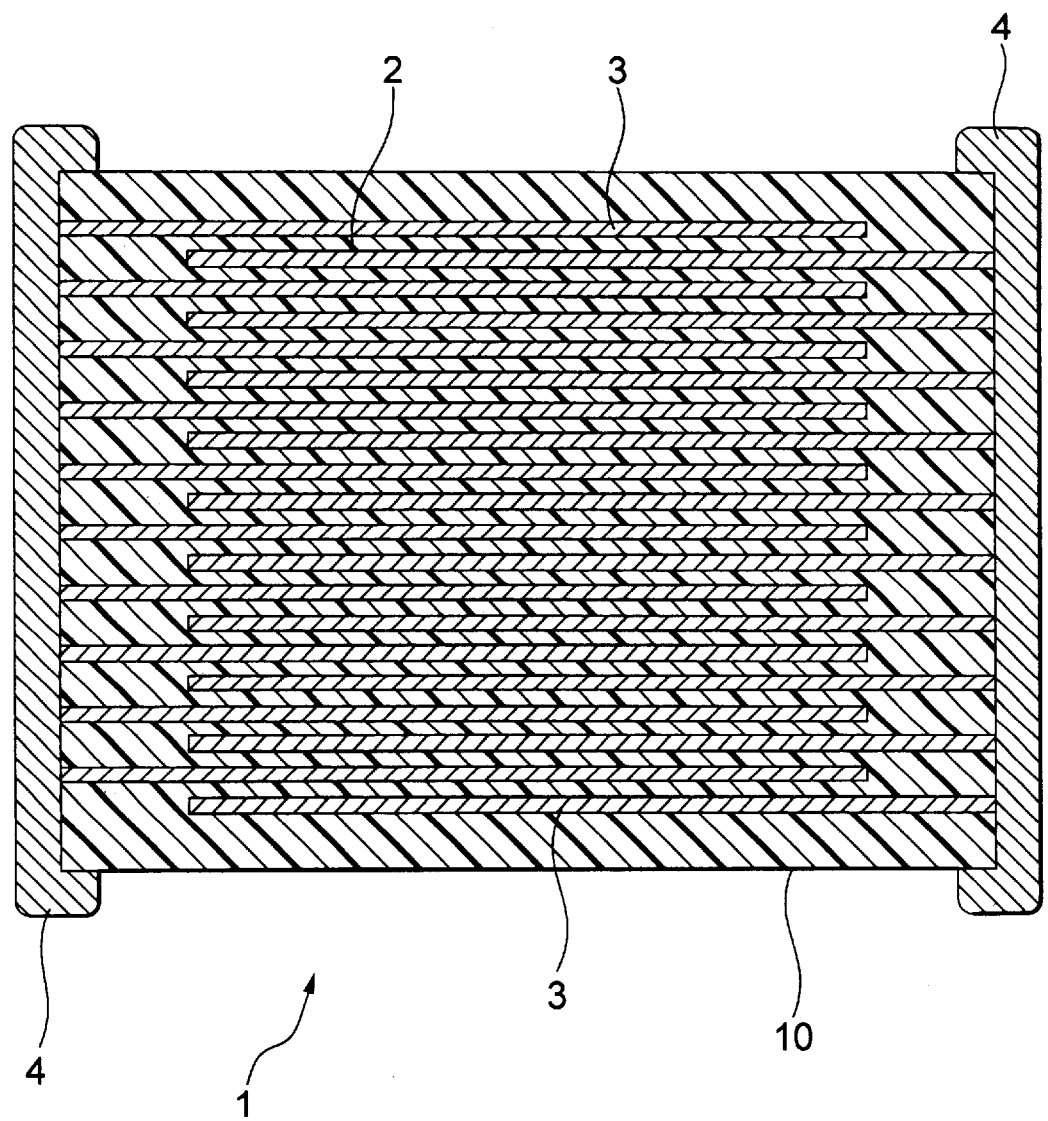
FIG. 1 is a sectional view of a multi-layer ceramic capacitor according to an embodiment of the present invention.

As shown in FIG. 1, a multi-layer ceramic capacitor 1 according to an embodiment of the present invention comprises a capacitor element body 10 having the configuration of dielectric layers 2 and internal electrode layers 3 being alternately stacked. On the both end portions of the capacitor element body 10 are formed a pair of external electrodes 4, which are respectively connected to the internal electrode layers 3 arranged alternately in the element body 10. The shape of the capacitor element body 10 is not specifically limited, but it is normally a rectangular parallelepiped shape. The size is not specifically limited either and may be an appropriate size in accordance with applications, but it is normally about (0.6 to 5.6 mm)×(0.3 to 5.0 mm)×(0.3 to 1.9 mm).

The internal electrode layers 3 are stacked so that the respective ends are alternately exposed at the two opposite end surfaces of the capacitor element body 10. The pair of external electrodes 4 are formed at the both end portions of the capacitor element body 10 and connected to the exposed end portions of the alternately arranged internal electrode layers 3 to form a capacitor circuit.

Dielectric Layer 2

The dielectric layer 2 contains a dielectric ceramic composition of the present invention.

A dielectric ceramic composition of the present invention, comprises a main component expressed by a composition formula $[SrZrO_3]_x+[CaTiO_3]_{(1-x)}$ wherein "x" indicating a mole ratio in the composition formula satisfies $1.00 \geq x \geq 0.60$ and a sub component including at least $B_2O_3$, $SiO_2$ and $Li_2O$, and satisfies $1.80 > a \geq 0.25$
$1.80 > b \geq 0.20$
$1.80 > c \geq 0$
$1.10 > d \geq 0$
$6.30 > e \geq 0.05$
$10.00 > a+b+c+d+e > 0.50$ where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component.

The dielectric ceramic composition of the present invention is able to be burned at a relatively low temperature of 1000° C. or less, has a high Qf value (for example Qf=2000 or more) a desired dielectric constant (for example ∈r=24 to 80) and a temperature coefficient TCf which is +300 to −80 ppm/° C. Accordingly, the dielectric ceramic composition can be preferably used in a multi-layer chip capacitor using cu, Ag, etc. as an internal conductor.

Further, in the case of a dielectric ceramic composition wherein the value of the above "x" satisfies $1.00 \geq x \geq 0.90$, the Qf value further increases (for example Qf=4000 or more) and the temperature coefficient TCf becomes +100 to −80 ppm/° C., so that the characteristics become still better.

The average crystalline particle diameter of the dielectric ceramic composition of the present invention is not specifically limited and may be appropriately determined from the range of, for example 0.1 to 3.0 μm, in accordance with the thickness of the dielectric layer, etc.

The thickness of the dielectric layer comprised of the dielectric ceramic composition of the present invention is normally 40 μm or less, preferably 30 μm or less. The lower limit of the thickness is normally about 2 μm.

Note that the number of stacked dielectric layers is normally about 2 to 300.

Internal Electrode Layer 3

Electroconductive materials included in the internal electrode layer 3 are not specifically limited, but such materials having an excellent conductivity as Cu and/or Ag are used in the present embodiment.

The thickness of the internal electrode layer may be appropriately determined in accordance with applications, etc., but is normally preferable to be 0.5 to 5 μm, more preferable to be 0.5 to 2.5 μm.

External Electrodes 4

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually 10 to 50 μm or so.

Method of Manufacturing Multi-Layer Ceramic Capacitor

The multi-layer ceramic capacitor using the dielectric ceramic composition of the present invention, is produced by preparing a green chip using the usual printing method or sheet method which uses pastes, burning the green chip, then printing or transferring and burning the external electrodes in the same way as the conventional multi-layer ceramic capacitor. The method of manufacturing will be explained in detail below.

The dielectric layer paste may be an organic-based coating material comprised of a mixture of dielectric ingredients and organic vehicles and may also be a water-based coating materials.

For the dielectric ingredient, use may be made of the above-mentioned oxides or mixtures therefore or composite oxides, but it is also possible to suitably select and mix various compounds which will become the above oxides or composite oxides after burning, for example, carbonates, oxalates, nitrates, hydroxides, and organic metal compounds. The content quantity of the respective compounds in the dielectric ingredient may be suitably determined so as to create the above-mentioned dielectric ceramic composition after burning.

The dielectric ingredient is normally used as a powder with an average particle size of 0.1 to 3 μm.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when using a water-based paint as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of conductive metals and alloys or various types of oxides which will become the above electroconductive materials after burning, an organic metal compound, resinate, etc. together with the above organic vehicle.

The external electrode paste may be prepared in the same way as the above internal electrode layer paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

When using a printing method, the dielectric layer paste and the internal electrode layer paste are successively printed on the PET or other substrate. The result is then cut into a predetermined shape, and the pastes are peeled off from the substrate to form a green chip.

Further, when using a sheet method, a dielectric layer paste is used to form a green sheet, the internal electrode layer paste is printed on top of this, then these are stacked to form a green chip.

Before burning the green chip, the green chip is processed to remove the binder. This process for removing the binder may be performed under ordinary conditions.

The holding temperature at the time of burning the green chip is not specifically limited but preferably 900 to 1000° C. If the holding temperature is less than the above range, the densification of the dielectric layers tends to become insufficient, while if it is over that range, there is a tendency of easily causing defaults in the internal electrode layers comprised of Cu or Ag.

Note that the burning atmosphere is not specifically limited and is normally in air or in a reducing atmosphere. Note that when burning in a reducing atmosphere, the capacitor device body is preferably annealed. The annealing process is for reoxidizing the dielectric layer. Since this enables the insulation resistance lifetime to be remarkably prolonged, the reliability is improved.

In the above processing for removing the binder, burning, and annealing, for example, a wetter etc. may be used to wet the $N_2$ gas or mixed gas. In this case, the temperature of the water is preferably 5 to 75° C.

The process for removing the binder, burning, and annealing may be performed consecutively or independently.

The thus obtained capacitor device body is, for example, end polished using barrel polishing or sandblasting etc., then printed or transferred with an external electrode paste and burned sintered to form the external electrodes 4. The burning conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using a plating technique etc.

The thus produced multi-layer ceramic capacitor of the present invention is mounted by soldering it onto a printed circuit board for use in various types of electronic equipment.

Note that the present invention is not limited to the above embodiments and may be modified in various ways within the scope of the invention.

For example, in the above embodiments, illustration was made of a multi-layer ceramic capacitor as the electronic device according to the present invention, but the electronic device according to the present invention is not limited to a multi-layer ceramic capacitor and may be any device having a dielectric layer comprised of the above dielectric ceramic composition.

Next, the present invention will be explained with reference to more detailed examples, but the present invention is not limited to these examples.

EXAMPLE 1

$SrCO_3$, $CaCO_3$, $ZrO_2$ and $TiO_3$ of high purity purchased on the market were used as start materials, the mole ratio of Sr/Zr and Ca/Ti were both made to be 1.000, and the material powder was measured so that the content of the main composition ratio "x" after burning satisfied the value shown in Table 1 which will be explained later on. Next, after adding water as a medium to the material powder and mixing it with a ball-mill for 24 hours, the mixture was dried, then pre-burned at 1200° C. for two hours.

After the thus obtained pre-burned material was wet pulverized using a ball-mill, etc., powders of $B_2O_3$, $SiO_2$, ZnO, $Al_2O_3$ were measured so that the content after being burned would also become the value shown in Table 1, and powders of $Li_2CO$ were measured in order to become the content shown in Table 1 by the $Li_2O$ conversion, then mixed using a ball-mill for 24 hours.

At this time, the respective additive components may be those turned into glass components in advance.

After drying the mixture, a suitable amount of an organic binder was added to granulate, the granulated substance was pressed with a pressure force of about 3 t/cm², and a columnar molded article having a diameter of 12 mm and a thickness of 6 mm was prepared.

After the above molded article was processed to remove the binder at 400° C. for four hours in the air, it was sintered at the respective temperatures shown in Table 1 to be explained later on for two hours continuously in the air or in a non-oxidizing atmosphere, such as a nitrogen atmosphere.

Next, the thus obtained burned body is processed and columnar samples having a diameter of 10 mm and a thickness of 5 mm were prepared. Evaluation of dielectric characteristics was measured on the above samples by the dielectric resonance method as to a relative dielectric constant εr and a Q value in the resonance frequency of 6 to 7 GHz and a temperature coefficient TCf of a resonance frequency in −40° C. to +80° C. Note that the Q value was calculated as a Qf value which was a Q value (Q×fr: fr is a measured frequency) in 1 GHz. The results are shown together in Table 1.

Note that in Table 1, when expressing the main component by the composition formula of $[SrZrO_3]_x+[CaTiO_3]_{(1-x)}$, "x" indicates the mole ratio in the composition formula. Also, "a", "b", "c", "d", and "e" in Table 1 are parts by weight of $B_2O_3$, $SiO_2$, ZnO, $Al_2O_3$ and $Li_2O$, respectively with respect to 100 parts by weight of the main components.

TABLE 1

| SAMPLE No. | MAIN COMPOSITION RATIO X (MOLE RATIO) | CONTENT OF ADDITIVES | | | | | a + b + c + d + e | CHARACTERISTICS | | | |
|---|---|---|---|---|---|---|---|---|---|---|---|
| | | a | b | c | d | e | | BURNING TEMPERATURE (° C.) | RELATIVE DIELECTRIC CONSTANT | Qf (GHz) | TCf (ppm/° C.) |
| | | (PARTS BY WEIGHT) | | | | | | | | | |
| *1 | 1.00 | *0.00 | *0.00 | 0.00 | 0.00 | *0.00 | 0.00 | UNABLE TO MEASURE CHARACTERISTICS DUE TO INSUFFICIENT SINTERING AT 1000° C. | | | |
| 2 | 1.00 | 1.25 | 1.25 | 1.25 | 0.75 | 0.50 | 5.00 | 950 | 26 | 10700 | −71 |
| 3 | 1.00 | 1.25 | 1.25 | 1.25 | 0.75 | 4.50 | 9.00 | 900 | 24 | 13800 | −79 |
| 4 | 0.90 | 1.25 | 1.25 | 1.25 | 0.75 | 0.50 | 5.00 | 950 | 36 | 4100 | +98 |
| 5 | 0.90 | 1.25 | 1.25 | 1.25 | 0.75 | 4.50 | 9.00 | 900 | 31 | 6000 | +41 |
| 6 | 0.90 | 0.75 | 0.75 | 0.75 | 0.45 | 2.30 | 5.00 | 950 | 34 | 5200 | +78 |
| *7 | 0.90 | 0.75 | 0.75 | 0.75 | 0.45 | *6.30 | 9.00 | 900 | UNABLE TO MEASURE CHARACTERISTICS DUE TO LOW Q | | | |
| 8 | 0.95 | 1.25 | 1.25 | 1.25 | 0.75 | 1.50 | 3.00 | 1000 | 30 | 7700 | +2 |
| 9 | 0.95 | 1.75 | 1.75 | 1.75 | 1.05 | 0.70 | 9.00 | 1000 | 29 | 6000 | +38 |
| 10 | 0.96 | 1.75 | 1.75 | 1.75 | 1.05 | 2.70 | 9.00 | 950 | 28 | 6700 | −6 |
| 11 | 0.96 | 1.25 | 1.25 | 1.25 | 0.75 | 1.00 | 5.50 | 950 | 29 | 7100 | −8 |
| 12 | 0.96 | 1.00 | 1.00 | 1.00 | 0.60 | 1.40 | 5.00 | 950 | 30 | 7100 | −13 |
| 13 | 0.96 | 0.94 | 0.94 | 0.94 | 0.58 | 0.60 | 4.00 | 1000 | 32 | 10700 | −15 |
| 14 | 0.96 | 0.71 | 0.71 | 0.71 | 0.42 | 0.445 | 3.00 | 1000 | 33 | 10700 | −11 |
| *15 | 0.96 | 1.45 | 1.15 | 1.15 | 0.75 | *0.00 | 4.50 | UNABLE TO MEASURE CHARACTERISTICS DUE TO INSUFFICIENT SINTERING AT 1000° C. | | | |
| 16 | 0.96 | 1.45 | 1.15 | 1.15 | 0.75 | 0.550 | 5.00 | 1000 | 32 | 7300 | −6 |
| 17 | 0.96 | 0.87 | 0.69 | 0.69 | 0.45 | 0.30 | 3.00 | 950 | 34 | 9600 | −8 |
| 18 | 0.96 | 0.47 | 0.47 | 0.47 | 0.29 | 0.30 | 2.00 | 950 | 32 | 11100 | −12 |
| *19 | 0.96 | 0.58 | 0.46 | 0.46 | 0.30 | *0.00 | 1.80 | UNABLE TO MEASURE CHARACTERISTICS DUE TO INSUFFICIENT SINTERING AT 1000° C. | | | |
| 20 | 0.96 | 0.58 | 0.46 | 0.46 | 0.30 | 0.20 | 2.00 | 950 | 34 | 9300 | −7 |
| *21 | 0.96 | *0.24 | 0.24 | 0.24 | 0.13 | 0.15 | 1.00 | UNABLE TO MEASURE CHARACTERISTICS DUE TO INSUFFICIENT SINTERING AT 1000° C. | | | |
| 22 | 0.96 | 0.29 | 0.23 | 0.23 | 0.15 | 0.10 | 1.00 | 950 | 33 | 10400 | −7 |
| 23 | 0.89 | 1.25 | 1.25 | 1.25 | 0.75 | 2.50 | 7.00 | 950 | 38 | 3600 | +108 |
| *24 | 0.96 | 0.70 | 0.48 | 0.48 | 0.30 | *0.04 | 2.00 | UNABLE TO MEASURE CHARACTERISTICS DUE TO INSUFFICIENT SINTERING AT 1000° C. | | | |
| 25 | 0.96 | 0.25 | 0.20 | 0.00 | 0.00 | 0.05 | 0.50 | 1000 | 33 | 9000 | −7 |
| *26 | 0.96 | 1.75 | *1.80 | 1.75 | 1.00 | 1.00 | 7.30 | 950 | UNABLE TO MEASURE CHARACTERISTICS DUE TO LOW Q | | | |
| *27 | 0.96 | 1.75 | 1.75 | *1.80 | 1.00 | 1.00 | 7.30 | 950 | UNABLE TO MEASURE CHARACTERISTICS DUE TO LOW Q | | | |
| *28 | 0.96 | *1.80 | 1.75 | 1.75 | 1.00 | 1.00 | 7.30 | 950 | UNABLE TO MEASURE CHARACTERISTICS DUE TO LOW Q | | | |
| *29 | 0.96 | 1.70 | 1.70 | 1.70 | *1.10 | 1.00 | 7.20 | 950 | UNABLE TO MEASURE CHARACTERISTICS DUE TO LOW Q | | | |
| *30 | 0.96 | 1.70 | 1.70 | 1.70 | 0.90 | 4.00 | *10.00 | 950 | UNABLE TO MEASURE CHARACTERISTICS DUE TO LOW Q | | | |
| *31 | 0.96 | 0.25 | *0.19 | 0.00 | 0.00 | 0.05 | *0.49 | UNABLE TO MEASURE CHARACTERISTICS DUE TO INSUFFICIENT SINTERING AT 1000° C. | | | |

TABLE 1-continued

| SAMPLE No. | MAIN COMPOSITION RATIO X (MOLE RATIO) | CONTENT OF ADDITIVES | | | | | a + b + c + d + e | CHARACTERISTICS | | | |
|---|---|---|---|---|---|---|---|---|---|---|---|
| | | a | b | c | d | e | | BURNING TEMPERATURE (° C.) | RELATIVE DIELECTRIC CONSTANT | Qf (GHz) | TCf (ppm/° C.) |
| | | (PARTS BY WEIGHT) | | | | | | | | | |
| 32 | 0.80 | 1.25 | 1.25 | 1.25 | 0.75 | 2.50 | 7.00 | 950 | 52 | 3000 | +182 |
| 33 | 0.60 | 1.25 | 1.25 | 1.25 | 0.75 | 2.50 | 7.00 | 950 | 80 | 2100 | +290 |
| *34 | *0.55 | 1.25 | 1.25 | 1.25 | 0.75 | 2.50 | 7.00 | 950 | UNABLE TO MEASURE CHARACTERISTICS DUE TO LOW Q | | |

EXAMPLE 2

An Example 2 of the present invention will be explained next. In the Example 2, other than using powders of $SrZrO_3$ and $CaTiO_3$ prepared by the hydrothermal reaction method as starting materials, samples were prepared and evaluated in the same way as in the above Example 1. The results are shown in Table 2.

TABLE 2

| SAMPLE No | MAIN COMPOSITION x (MOLE RATIO) | CONTENT OF ADDITIVES | | | | | a + b + c + d + e | CHARACTERISTICS | | | |
|---|---|---|---|---|---|---|---|---|---|---|---|
| | | a | b | c | d | e | | BURNING TEMPERATURE (° C.) | RELATIVE DIELECTRIC CONSTANT | Qf (GHz) | TCf (ppm/° C.) |
| | | (PARTS BY WEIGHT) | | | | | | | | | |
| 41 | 1.00 | 1.25 | 1.25 | 1.25 | 0.75 | 0.50 | 5.00 | 950 | 27 | 14100 | −65 |
| 42 | 0.96 | 0.29 | 0.23 | 0.23 | 0.15 | 0.10 | 1.00 | 950 | 34 | 9800 | −11 |
| 43 | 0.90 | 1.25 | 1.25 | 1.25 | 0.75 | 0.50 | 5.00 | 950 | 35 | 4400 | +83 |
| 44 | 0.80 | 1.25 | 1.25 | 1.25 | 0.75 | 0.50 | 5.00 | 950 | 55 | 3600 | +157 |

Evaluation

In Table 1, the samples No. 2, 3, 4, 5, 6, 8, 9, 10, 11, 12, 13, 14, 16, 17, 18, 20, 22, 23, 25, 32 and 33 are in the range of the present invention, while the samples No. 1, 7, 15, 19, 21, 24, 26, 27, 28, 29, 30, 31 and 34 marked with * are comparative examples outside the range of the present invention.

According to the results, it would be understood that a dielectric ceramic composition of the present invention can be burned at a relatively low temperature of 1000° C. or less and further has excellent characteristics of having the relative dielectric constant εr of 24 to 80, a Qf value of 2000 or more and a temperature coefficient TCf of the resonance frequency of +300 to −80 ppm/° C.

Furthermore, in the desired range wherein a value x in the composition formula of the main components fulfills 1.00≧x≧0.90, better excellent characteristics are shown which means that the temperature coefficient becomes +100 to −80 ppm/° C. which is closer to the NP0 range, and the Qf value becomes 4000 or more.

On the other hand, in the samples No. 1, 7, 15, 19, 21, 24, 26 to 31 and 34 outside the range of the present invention, the object of the present invention cannot be attained because of being insufficiently sintered at 1000° C. or less, the low Qf value resulting in difficulty in practical use, etc.

Further, according to the results in Table 2, it would be understood that the same characteristics are shown even when using powders prepared by the hydrothermal reaction method as original powder.

Next, the reason for limiting the value of the composition range will be explained with reference to Table 1.

When the main composition ratio "x" is less than 0.60, the Qf is too low and unsuitable for practical use (See the sample No. 34 in Table 1).

When the value of "a" is 1.80 or more, the Qf value becomes low and unsuitable for the practical use (See the sample No. 28 in Table 1). Also, when the value of "a" is less than 0.25, it can not be burned at 1000° C. or less (See the samples No. 1 and No. 21 in table 1).

When the value of "b" is 1.80 or more, the Qf value becomes low and unsuitable for practical use (See the sample No. 26 in Table 1). Also, when the value of "b" is less than 0.20, it can not be burned at 1000° C. or less (See the samples No. 1 and No. 31 in table 1).

When the value of "c" is 1.80 or more, the Qf value becomes low and unsuitable for practical use (See the sample No. 27 in Table 1).

When the value of "d" is 1.10 or more, the Qf value becomes low and unsuitable for practical use (See the sample No. 29 in Table 1).

When the value of "e" is 6.30 or more, the Qf value becomes low and unsuitable for practical use (See the sample No. 7 in Table 1). Also, when the value of "e" is less than 0.05, it can not be burned at 1000° C. or less (See the sample Nos. 1, 15, 19 and 24 in table 1).

When the value of a+b+c+d+e is 10.00 or more, the Qf value becomes low and unsuitable table for practical use (See the sample No. 30 in Table 1). Also, when the value is less than 0.50, it can not be burned at 1000° C. or less (See the samples No. 1 and No. 31 in table 1).

What is claimed is:
1. A dielectric ceramic composition, comprising:
a main component expressed by a composition formula $[SrZrO_3]_x+[CaTiO_3]_{(1-x)}$ wherein "x" indicating a mole ratio in the composition formula satisfies 1.00≧x≧0.60; and a sub component including at least $B_2O_3$, $SiO_2$ and $Li_2O$, and satisfying:

$1.80 > a \geq 0.25$
$1.80 > b \geq 0.20$
$1.80 > c \geq 0$
$1.10 > d \geq 0$
$6.30 > e \geq 0.05$
$10.00 > a+b+c+d+e \geq 0.50$ where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component.

2. The dielectric ceramic composition as set forth in claim 1, wherein said mole ratio "x" satisfies $1.00 \geq x \geq 0.90$.

3. An electric device comprising an internal electrode layer and a dielectric layer, wherein said dielectric layer comprises:
a main component expressed by $[SrZrO_3]_x + [CaTiO_3]_{(1-x)}$, wherein "x" indicating a mole ratio in the composition formula satisfies $1.00 \geq x \geq 0.60$; and
a sub component including at least $B_2O_3$, $SiO_2$ and $Li_2O$,
and satisfies:

$1.80 > a \geq 0.25$
$1.80 > b \geq 0.20$
$1.80 > c \geq 0$
$1.10 > d \geq 0$
$6.30 > e \geq 0.05$
$10.00 > a+b+c+d+e \geq 0.50$ where a content ratio of $B_2O_3$ is "a" parts by weight, a content ratio of $SiO_2$ is "b" parts by weight, a content ratio of ZnO is "c" parts by weight, a content ratio of $Al_2O_3$ is Id parts by weight and a content ratio of $Li_2O$ is "e" parts by weight with respect to 100 parts by weight of said main component.

4. The electric device as set forth in claim 3, wherein said mole ratio "x" satisfies $1.00 \geq x \geq 0.90$.

5. The electric device as set forth in claim 3, wherein said internal electrode layer contains Cu and/or Ag.

6. A method of producing an electric device, comprising the steps of:

preparing a material which is to be a main component expressed by a composition formula $[SrZrO_3]_x + [CaTiO_3]_{(1-x)}$ wherein "x" indicating a mole ratio satisfies $1.00 \geq x \geq 0.60$, preparing a material which is to be a sub component including at least $B_2O_3$, $SiO_2$ and $Li_2O$, and satisfying $1.80 > a \geq 0.25$
$1.80 > b \geq 0.20$
$1.80 > c \geq 0$
$1.10 > d \geq 0$
$6.30 > e \geq 0.05$
$10.00 > a+b+c+d+e \geq 0.50$ where a content ratio of $B_2O_3$ is "a" parts by weight, a content ratio of $SiO_2$ is "b" parts by weight, a content ratio of ZnO is "c" parts by weight, a content ratio of $Al_2O_3$ is "d" parts by weight and a content ratio of $Li_2O$ is "e" parts by weight with respect to 100 parts by weight of said main component;

obtaining a dielectric layer paste by mixing the material of the main component with the material of the sub component;

obtaining an internal electrode layer paste;

preparing a green chip to be an element body after being burned having a dielectric layer and an internal electrode layer by using said dielectric layer paste and internal electrode layer paste; and burning said green chip at a temperature of 900 to 1000° C.

7. The method of producing an electric device as set forth in claim 6, wherein said main component material is prepared so that said mole ratio "x" satisfies $1.00 \geq x \geq 0.90$.

8. The method of producing an electric device as set forth in claim 6, wherein Cu and/or Ag is contained as an electroconductive material when preparing said internal electrode layer paste.

* * * * *